Aug. 29, 1950     L. G. HAWKINS     2,520,543
TABLE, TROLLEY OR THE LIKE

Filed Aug. 19, 1947     2 Sheets-Sheet 1

Inventor
By Lawrence G. Hawkins
Emery, Holcombe & Blair
Attorney

Aug. 29, 1950 L. G. HAWKINS 2,520,543
TABLE, TROLLEY OR THE LIKE
Filed Aug. 19, 1947 2 Sheets-Sheet 2
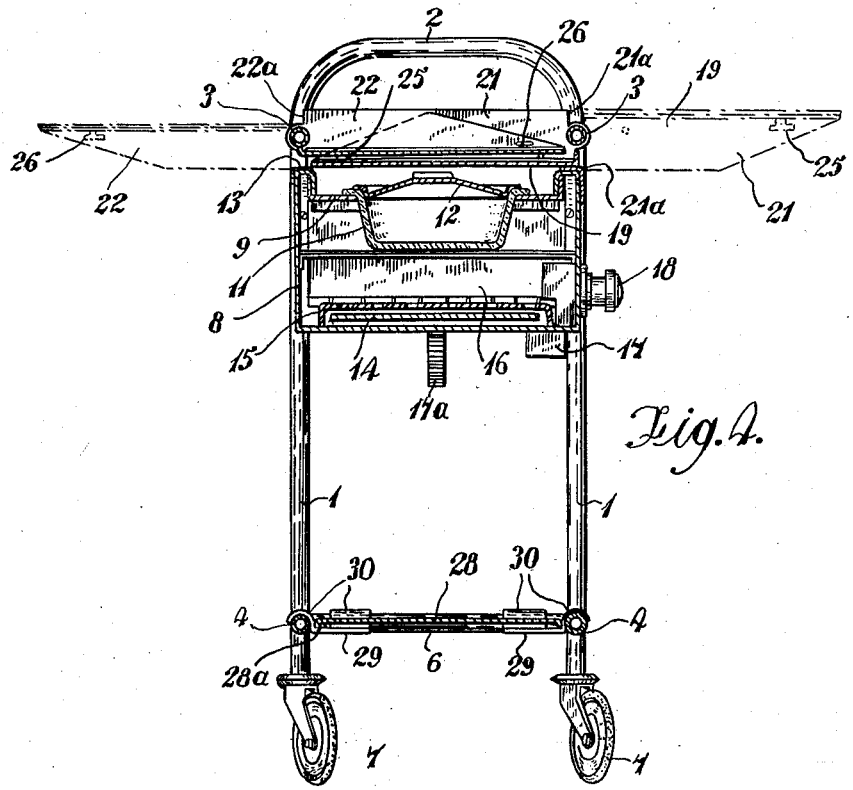
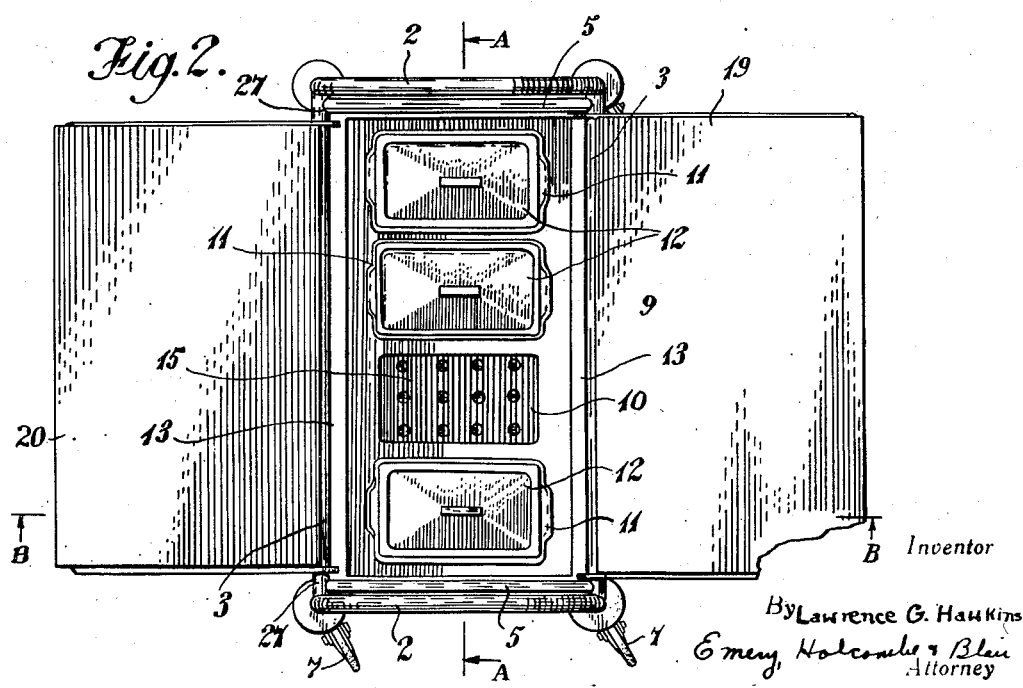
Inventor
By Lawrence G. Hawkins
Emery, Holcombe & Blair
Attorney

UNITED STATES PATENT OFFICE 2,520,543

TABLE, TROLLEY, OR THE LIKE

Lawrence George Hawkins, London, England, assignor to L. G. Hawkins & Company Limited, London, England Application August 19, 1947, Serial No. 769,406
In Great Britain October 1, 1946

7 Claims. (Cl. 219—35)

The present invention relates to tables, trolleys or the like, and particularly to wheeled trolleys which may incorporate means for serving food products and for warming or keeping the food products warm.

According to the present invention the upper platform, surface or the like of a table or trolley has associated therein a hinged flap which can be swung from one position in which it overlies the said platform or surface to a substantially parallel position in which it extends from the side of the table or trolley to form an additional table surface or platform. The flap preferably covers the entire upper surface of the trolley when overlying the same. According to a feature of the invention two such hinged flaps are provided, each adapted in one position to overlie the upper surface of the trolley, one above the other, and each adapted to swing or pivot in opposite directions so as to form extension surfaces on opposite sides of the trolley.

From another aspect, the invention consists in a table or trolley comprising a box-like chamber supported on legs, preferably provided with wheels or casters at their lower ends, the upper surface of the box-like chamber being provided with recesses or removable containers within which food products may be placed, wherein means are provided for heating the chamber for warming or keeping warm the food products contained in the recesses or containers and wherein the table or trolley is provided with a hinged flap which can be swung from one position in which it overlies the said upper surface to a substantially parallel position in which it extends from the side of the table or trolley to form an additional table surface or platform. When the flap is positioned over the upper surface of the chamber it constitutes a lid over the recesses or containers for the food products. If desired, each of the recesses or containers may also be provided with separate removable lids which preferably completely close the recesses or containers to prevent the moisture in the food products from being evaporated.

Preferably two hinged flaps are provided, each adapted in one position to overlie the upper surface of the heated chamber, one above the other, and each adapted to swing or pivot in opposite directions so as to form extension table surfaces on opposite sides of the trolley, in which position the food recesses or containers are accessible.

In the preferred embodiment, the chamber is heated by one or more electric heaters, preferably of the black heat type, which are disposed in the chamber beneath the recess or containers so as to heat the same, the surface area of the chamber and the heat radiating properties of the same being such that the food products will be maintained at the desired temperature for consumption.

A still further feature of the invention consists in providing the chamber with one or more openings, provided with doors or the like, through which plates may be inserted into the chamber for warming them. Conveniently a perforated platform upon which the plates may rest is disposed within the chamber and above the electric heaters, doors being provided at opposite ends of the chamber through which the plates may be inserted.

In order that the invention may be more clearly understood, an embodiment thereof will now be described with reference to the accompanying drawings, in which:

Figure 2 shows a plan view;

Figure 4 shows a section in a vertical plane along the line B—B of Figure 2, but with the flaps closed.

Figure 1:
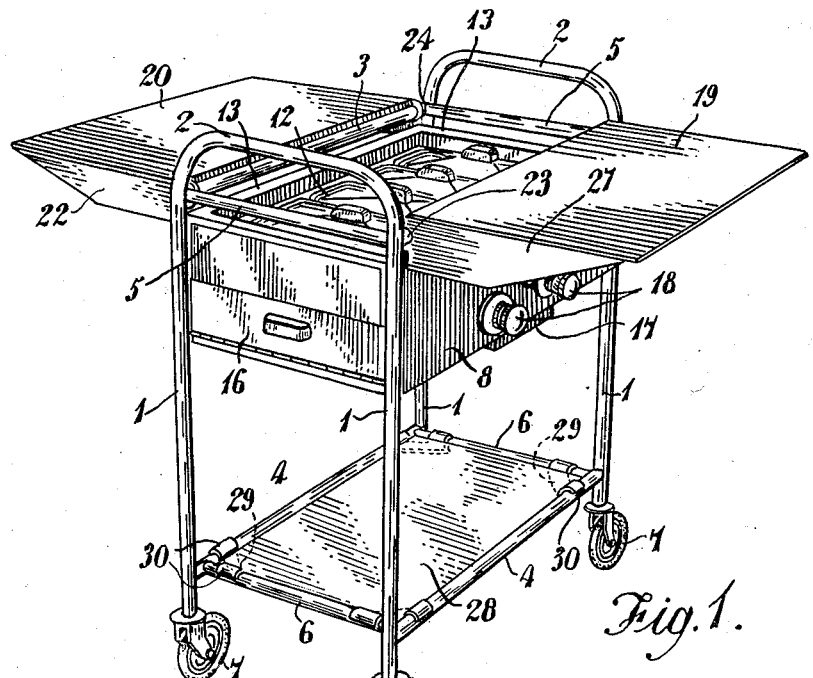
Figure 1 shows a perspective view of the trolley with the flaps extended.
Figure 3:
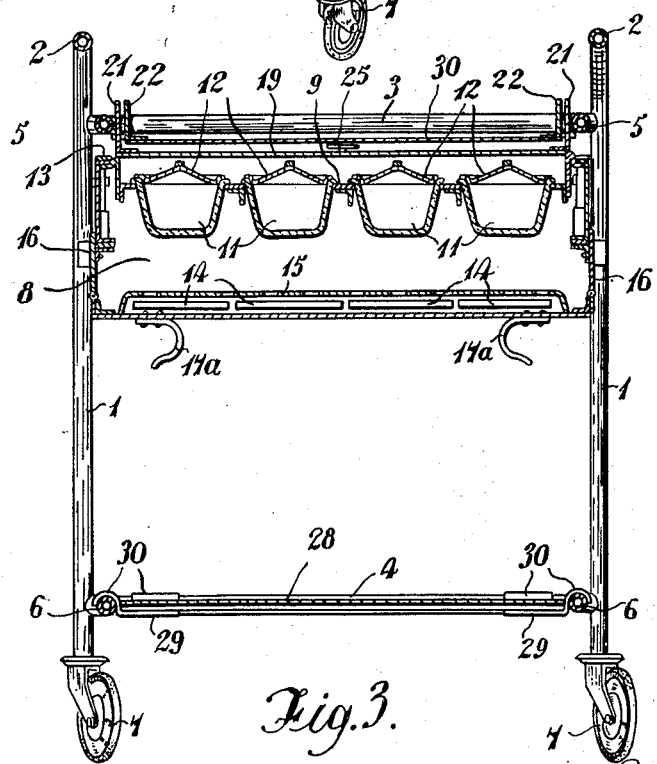
Figure 3 shows a section in a vertical plane along the line A—A of Figure 2, but with the flaps closed.

Referring to the drawings, the trolley is constructed with four legs 1 which may be conveniently formed of tubular metal, each pair of legs at each end of the trolley being formed from a single length of tubing which is bent to form transverse handles 2 at the top ends of the trolley. The end members thus formed may be interconnected by top and bottom side members 3, 4, respectively, which may also be formed from tubular metal disposed at each side of the trolley, and further bracing and spacing members 5 and 6, also of tubular metal, may be attached between the ends of the pairs of spacing members 3, 4 respectively, as shown in the drawing. The bottoms of the legs 1 may be provided with wheels 7 so that the trolley may be easily moved about.

Secured between the four legs of the trolley and just below the upper side and end spacing members 3 and 5 is a metal box-like chamber 8 constituting the heating chamber. The upper surface 9 of the chamber is provided with a series of apertures 10, shown as four in the drawings, adapted to accommodate removable containers 11 made, for example, of heat-resisting glass such as is known under the registered trade-mark "Pyrex." Each container may be provided with a metal lid 12. The upper surface 9 is preferably positioned slightly below the level of the top rim 13 of the chamber 8 to allow space for accommodating the lids 12 and the handles thereon.

Within and near the bottom of the chamber 8 are disposed a plurality of black heat electric elements 14 and directly thereabove is disposed a perforated platform 15, the space between which and the bottom of the containers 11 is sufficient to accommodate a few stacked plates (not shown). Access to the chamber for inserting plates to be warmed is obtained through doors 16 arranged at opposite ends of the heating chamber 8, which doors are preferably hinged along their bottom edges. The flexible cable lead from the trolley, when not in use, may be wound around the members 17a. The electric mains supply is connected to the chamber through the junction box 17. Preferably electric sockets are provided on the side of the chamber 18 to which other electrical devices, such as a toaster or coffee percolator, may be connected.

The top of the chamber is closed by a flap 19 which is hinged so as to be swung to form a serving platform at the side of the trolley. A second flap 20 is also provided which is adapted to overlie the flap 19 above the chamber when both flaps are positioned thereabove. Each flap is hinged to the trolley about the adjacent upper side spacer member 3. For this purpose, the flaps 19 and 20 are formed with flanges 21, 22 respectively at their opposite ends which are provided with apertures 23, 24 respectively at their inner ends to swing about the side members 3. The positioning of the aperture 23 is such that the flap 19, when folded to overlie the heating chamber, lies close against the upper rim 13 thereof. The exposed surface of the flap 19, when in this position, may carry a knob 25 to facilitate it being raised and swung to the extended position. Bearing apertures 24 in the flanges 22 of the other flap 20 are so positioned that the flap 20 can overlie the flap 19 in a substantially horizontal position when it is folded above the heating chamber. It may also carry a knob 26 to facilitate it being raised.

The two flaps 19 and 20, together with their flanges, may conveniently be made from sheet metal, the flanges 21 of the flap 19 being more widely spaced than the flanges 22 of the flap 20 whereby the flap 20 may fit within the flanges 21 of the flap 19 when both flaps are folded over the heating chamber. Spacer members 27 may be provided over the tubular side member 3 carrying the flap 20 to ensure its fitting within the flanges 21 of the flap 19 when both flaps are folded over the heating chamber.

When in the extended position, the inner edges 21a, 22a of the flanges 21, 22 respectively engage the side walls of the heating chamber 8 to hold the flaps in a substantially horizontal position.

A lower platform 28 may be provided on the trolley beneath the heating chamber and may be conveniently carried by the lower spacer members 4 and 6. This lower platform is removable and supported on angle-pieces 29 carried from the spacer members 4 and 6 adjacent the corners thereof. These angle-pieces 29 may be made of strip metal and be formed at their ends with semi-cylindrical portions 30 disposed at right angles to one another whereby each angle-piece may be supported across a corner between two adjacent spacer members. The lower platform, which may be made from sheet metal and provided with a flange 28a along one or more of its edges, is supported upon the angle-pieces 29 positioned at the four adjoining corners of the bottom spacer members.

By means of the arrangement described, food products placed within the containers 11 may be kept warm at the desired temperature for serving for long periods of time. The lids 12 prevent the moisture from being evaporated from the food product. The surface area of the heating chamber and the heat radiating properties of the same are such that, for the heat generated by the heaters 14, the food products will be maintained at the desired temperature for consumption.

Whilst a particular embodiment has been described, it will be understood that various modifications may be made without departing from the spirit of the invention. For example, members which may be hinged to the heating chamber or trolley may be provided for supporting the flaps in their extended positions, instead of supporting them by the ends of the flanges engaging with the heating chamber. Furthermore, the heating chamber may be heated by water or other fluid, for example, by constructing the heating chamber with a water jacket which may be heated by electric immersion heaters, by electric heaters clamped to the bottom or other surface thereof, or by gas or other forms of heating.

I claim:

1. A table or trolley comprising a boxlike chamber supported on legs, the upper surface of the boxlike chamber being provided with heat-conducting containers within which food products may be placed, said containers extending into said chamber so as to be in heat-conducting relation with the interior thereof, a rim around said upper surface, a pair of flaps respectively hinged adjacent the top edges at opposite sides of the boxlike chamber which are each adapted in one position to overlie the upper surface of the chamber, in spaced relation one above the other, with the underneath flap fitting against the rim, and are each adapted to swing in opposite directions so as to form extension surfaces on opposite sides of the said upper surface, a platform positioned within the chamber beneath the undersides of the containers, an aperture in a side wall of the boxlike chamber for permitting access to the platform, a door for closing said aperture, and heating means positioned beneath said platform.

2. A table or trolley comprising a boxlike chamber supported on legs, the upper surface of the boxlike chamber being provided with heat-conducting containers within which food products may be placed, said containers extending into said chamber so as to be in heat-conducting relation with the interior thereof, a pair of flaps respectively hinged adjacent the top edges at opposite sides of the boxlike chamber and each adapted in one position to overlie the upper surface of the chamber in spaced relation, one above the other, and to swing in opposite directions so as to form extension surfaces on opposite sides of the said upper surface, a platform positioned within the chamber beneath the undersides of the containers, an aperture in a side wall of the boxlike chamber for permitting access to the platform, a door for closing said aperture, and an electric heating element positioned beneath said platform.

3. A table or trolley comprising a tubular framework having leg portions, a boxlike chamber carried by said tubular framework, the upper surface of the boxlike chamber being provided with containers within which food products may be placed, two tubular members of said framework extending respectively adjacent the top edges of opposite sides of said chamber, two flaps respectively mounted for swinging movement about one of said tubular members, and each adapted in one position to overlie the upper surface of the chamber and said containers in spaced relation, one above the other, and to swing in opposite directions so as to form extension surfaces on opposite sides of the said upper surface, and means for heating the chamber.

4. A food serving trolley comprising a box-like chamber, a plurality of heat-conducting receptacles within which food products may be placed provided in the upper surface of said chamber, each of said receptacles extending into the chamber, so as to be in heat-conducting relation with the interior of the chamber, a means in the chamber for heating the air in the chamber and thereby warming or keeping warm food products contained in the receptacles, an opening in a side wall of the chamber for introducing into and removing from the chamber plates to be kept warm, movable means for normally closing said opening, legs for supporting such chamber, and a pair of hinged flaps each adapted in one position to overlie substantially the whole of the upper surface of the chamber, one above the other in spaced relation and each adapted to swing in opposite directions about horizontal axes respectively disposed adjacent to the two side walls of the character to positions in which they respectively form extension surfaces at opposite sides of the said upper surface.

5. A food serving table or trolley as claimed in claim 4, wherein the receptacles are each provided with individually removable lids which completely close the receptacles, the distance between said upper surface and said flaps when closed being sufficient to accommodate said lids on the receptacles.

6. A table or trolley comprising a box-like chamber supported on legs, the upper surface of the box-like chamber being provided with containers within which food products may be placed, a rim around said upper surface, a pair of flaps respectively hinged adjacent the top edges at opposite sides of the box-like chamber which are each adapted in one position to overlie the upper surface of the chamber, one above the other, with the underneath flap fitting against the rim so as to form jointly with said rim and upper surface, a further closed chamber, said flaps being adapted to swing in opposite directions, stop means for supporting said flaps in a horizontal position so as to form extension surfaces on opposite sides of the said upper surface, and means for heating the chamber.

7. A food serving table or trolley comprising an oblong, box-like chamber having two longer and two shorter side walls, a plurality of food receptacles in the upper surface of the said chamber, and two flaps adapted in one position to lie one above the other, each to overlie said receptacles and substantially the whole of the upper surface of the chamber, each said flap being hinged to said chamber alongside one of said longer side walls for movement about a horizontal axis to expose the said upper surface and form lateral extension surfaces on opposite sides thereof.

LAWRENCE GEORGE HAWKINS.

REFERENCES CITED

The following references are of record in the file of this patent:

UNITED STATES PATENTS

| Number | Name | Date |
| --- | --- | --- |
| 296,043 | Neumuller et al. | Apr. 1, 1884 |
| 543,519 | Young | July 30, 1895 |
| 1,037,771 | Hughes | Sept. 3, 1912 |
| 1,170,712 | Trombley | Feb. 8, 1916 |
| 1,375,148 | Guidal | Apr. 19, 1921 |
| 1,455,395 | Exum | May 15, 1923 |
| 1,585,834 | Drinkwater | May 25, 1926 |
| 1,727,395 | Coffey | Sept. 10, 1929 |
| 1,948,937 | De Muth | Feb. 27, 1934 |
| 1,975,320 | Hamilton | Oct. 2, 1934 |
| 2,122,969 | Whitcomb | July 5, 1938 |
| 2,187,196 | Douglass | Jan. 16, 1940 |
| 2,481,384 | Blackwell | Sept. 6, 1949 |

FOREIGN PATENTS

| Number | Country | Date |
| --- | --- | --- |
| 442,390 | Great Britain | Feb. 7, 1936 |
| 568,873 | France | Jan. 2, 1924 |